US012654923B2

(12) United States Patent (10) Patent No.: US 12,654,923 B2
Buge (45) Date of Patent: Jun. 16, 2026

(54) BLISTER PACK

(71) Applicant: AIRNOV, INC., Wilmington, DE (US)

(72) Inventor: Laudine Buge, Cachan (FR)

(73) Assignee: AIRNOV, INC., New Castle (DE)

( * ) Notice: Subject to any disclaimer, the term of this patent is extended or adjusted under 35 U.S.C. 154(b) by 0 days.

(21) Appl. No.: 18/725,342

(22) PCT Filed: Dec. 30, 2022

(86) PCT No.: PCT/EP2022/088076
§ 371 (c)(1),
(2) Date: Jun. 28, 2024

(87) PCT Pub. No.: WO2023/126519
PCT Pub. Date: Jul. 6, 2023

(65) Prior Publication Data
US 2025/0074680 A1 Mar. 6, 2025

(30) Foreign Application Priority Data
Dec. 30, 2021 (EP) ..................................... 21218301

(51) Int. Cl.
*B65D 75/36* (2006.01)
*B29C 45/00* (2006.01)
(Continued)

(52) U.S. Cl.
CPC ........ *B65D 75/368* (2013.01); *B29C 45/0053* (2013.01); *B29C 45/14631* (2013.01); (Continued)

(58) Field of Classification Search
CPC ........ B65D 81/264–268; B65D 75/324; B65D 75/368; A61J 1/035
See application file for complete search history.

(56) References Cited

U.S. PATENT DOCUMENTS 5,736,616 A 4/1998 Ching et al.
2013/0217142 A1* 8/2013 Farge ................... B65D 75/326
436/164

FOREIGN PATENT DOCUMENTS

FR 2660634 A1 10/1991
WO 96/07601 A1 3/1996
(Continued)

OTHER PUBLICATIONS

International Search Report with Written Opinion of the International Searching Authority, dated Jun. 5, 2023, with respect to International Application No. PCT/EP2022/088076.
(Continued)

*Primary Examiner* — Mollie Impink
(74) *Attorney, Agent, or Firm* — Scott R. Cox

(57) ABSTRACT

A blister pack including a blister film having at least one first recess for a consumable product and at least one second recess for an active member. Each second recess is connected to a first recess by a connecting channel. A lidding film is sealed to a sealing surface of the blister film to close each first recess and second recess while keeping the connecting channel open. The blister pack further includes a reinforcing strip having a support configured to at least partially cover the at least one second recess of the blister film while being in contact with the sealing surface. In the sealed configuration of the blister pack, the support of the reinforcing strip is sealed between the lidding film and the blister film in at least one contact region.

20 Claims, 8 Drawing Sheets

(51) Int. Cl.

| | | |
|---|---|---|
| *B29C 45/14* | (2006.01) | |
| *B29C 45/16* | (2006.01) | |
| *B65D 75/52* | (2006.01) | |
| *B65D 77/20* | (2006.01) | |
| *B29L 31/00* | (2006.01) | |

(52) U.S. Cl.

CPC .......... *B29C 45/1679* (2013.01); *B65D 75/52* (2013.01); *B65D 77/2024* (2013.01); *B29K 2995/0012* (2013.01); *B29L 2031/7164* (2013.01)

(56) References Cited

FOREIGN PATENT DOCUMENTS

| | | | |
|---|---|---|---|
| WO | 98/51758 | A1 | 11/1998 |
| WO | 99/48963 | A2 | 9/1999 |
| WO | 2018/149778 | A1 | 8/2018 |
| WO | 2019/197165 | A1 | 10/2019 |

OTHER PUBLICATIONS

Communication under Rule 71(3) EPC issued Mar. 21, 2024, with respect to parallel European Application No. 21 218 301.6.

* cited by examiner

BLISTER PACK

FIELD OF THE INVENTION

The present invention relates to a blister pack for consumable products, in particular pharmaceutical, nutraceutical or herbal products, in which active members are provided to regulate the atmosphere surrounding the consumable products. The active members may be selected, e.g., in the group of humidity absorbers, oxygen scavengers, odor absorbers, humidity emitters and/or emitters of volatile olfactory organic compounds. The invention also relates to a method for manufacturing a blister pack, and to a reinforcing strip for a blister pack.

BACKGROUND OF THE INVENTION

Within the meaning of the invention, a blister pack is any type of packaging having a bottom part, typically referred to as a "blister film", with a plurality of recesses formed therein, e.g., through vacuum forming or pressure forming, where each recess is configured to receive a respective consumable product such as, for example, a tablet, a capsule, a pill, etc. A cover, typically referred to as a "lidding film" is placed over and sealed to the blister film about the perimeter of each recess. In present day blister packs, the blister film is typically formed from a polymer material such as, for example, polyvinyl chloride (PVC), polyvinylidene dichloride (PVDC), a PVC/PVDC-combination, a PVC/PCTFE-combination or polystyrene (PS), or from a cold forming blister laminate comprising aluminum foils laminated with polymer films using dry bond lamination technology. The lidding film is typically an aluminum foil comprising a heat seal lacquer.

A known solution for integrating an active member in a blister pack consists in placing the active member, e.g., in the form of a desiccant or scavenger extruded film, in each recess containing a consumable product. A problem of this type of blister pack, whether it is a "push-through" type or a "peel-push" type of blister pack, is that the active member can be retrieved by a user at the same time as the consumable product. For a "push-through" blister pack, the user uses a finger to push against the blister film at the location of the recess, until the consumable product breaks through the lidding film, thereby rendering the active member also accessible. For a "peel-push" blister pack, the user first peels away an upper layer of a two-layer lidding film to reveal the lower layer and then pushes against the blister film at the location of the recess, until the consumable product breaks through the lower layer of the lidding film, also giving access to the active member. Such an easy accessibility creates a risk of accidental ingestion of the active member. In addition, in this known solution, the quantity of active material that can be used in each recess to regulate the atmosphere is limited by the size of the recess in which the consumable product is received, which does not allow for optimum atmosphere control.

In another known solution for integrating an active member in a blister pack, the blister film is provided with recesses dedicated to the active members, which are connected to the recesses containing the consumable products by connecting channels. For example, WO9607601A1 discloses a blister film comprising first recesses for consumable products and second recesses for active members, where each second recess is connected to a first recess by a canal, and the lidding foil in the region of the second recesses is reinforced by an additional protection sheet so that the retrieval of the active members is excluded if usual means are applied. This arrangement advantageously limits the accessibility to the active members and the risk of accidental ingestion thereof. However, the protection sheet is accessible and can still be removed. The addition of the protection sheet to the lidding foil in the region of the second recesses also requires a specific manufacturing step, which cannot be easily implemented on conventional blister manufacturing lines.

It is these drawbacks that the invention is intended more particularly to remedy by proposing a blister pack comprising at least one active member for regulating the atmosphere surrounding consumable products packaged inside the blister pack, where the blister pack reliably prevents a user from accessing the active member, thus limiting the risk of accidental ingestion thereof, and the blister pack can also be easily produced using conventional blister manufacturing lines.

DISCLOSURE OF THE INVENTION

For this purpose, a subject of the invention is a blister pack comprising:
- a blister film having at least one first recess for a consumable product and at least one second recess for an active member, wherein each second recess is connected to a first recess by a connecting channel, the blister film having a sealing surface which extends about the periphery of the first and second recesses and each connecting channel,
- a lidding film sealed to the sealing surface of the blister film so as to close each compartment comprising a first recess and a second recess connected to each other by a connecting channel while keeping the connecting channel open, wherein the blister pack further comprises a reinforcing strip having a support configured to at least partially cover the at least one second recess of the blister film while being in contact with the sealing surface of the blister film in at least one contact region at the periphery of the at least one second recess, wherein, in the sealed configuration of the blister pack, the support of the reinforcing strip is sealed between the lidding film and the blister film in the at least one contact region.

According to the invention, the support of the reinforcing strip covers each second recess and is sealed at the periphery of the second recess between the lidding film and the blister film, being advantageously sealed to one and preferably each of the lidding film and the blister film, which efficiently prevents a user from accessing the second recess and the active member received therein. Thus, the risk of accidental ingestion of the active member is reduced. In particular, the support of the reinforcing strip prevents a user from retrieving the active member from the second recess, in particular in a "push-through" or "peel-push" manner. The arrangement of the support sealed between the lidding film and the blister film ensures that the support is securely attached to the blister pack and cannot be removed by a user. Advantageously, the support of the reinforcing strip is made of a material allowing its sealing, in particular heat-sealing, between the lidding film and the blister film in the same manufacturing step as the sealing, in particular heat-sealing, of the lidding film to the sealing surface of the blister film. In one embodiment, in the sealed configuration of the blister pack, the support of the reinforcing strip is sealed, in particular heat-sealed, between and to each of the lidding film and the blister film in the at least one contact region.

According to one feature of the invention, the reinforcing strip comprises the support and at least one active member secured to the support such that, when the at least one active member is received in a second recess, the support at least partially covers the second recess and is in contact with the sealing surface of the blister film in at least one contact region at the periphery of the second recess. Thanks to this arrangement, the insertion of an active member in each second recess can be performed at the same time as positioning the support to cover the second recess, thus simplifying the manufacturing method of the blister pack.

According to one embodiment, the at least one active member of the reinforcing strip is a solidified polymer-based structure bonded to the support while in molten form. In this way, the reinforcing strip is a one-piece composite part comprising each active member secured to the support by thermal bonding, which offers a mechanically strong solution to prevent the accidental ingestion of the active member. In practice, each active member is welded onto a support, which in turn is welded to the lidding film and the blister film. Advantageously, the support of the reinforcing strip is also designed with relatively large dimensions which further contributes to reduce the risk of accidental ingestion.

In one embodiment, the at least one active member of the reinforcing strip is a solidified structure made of a polymer-based material overmolded over the support, by injection of a thermoplastic material in a mold cavity in which the support has been placed. Overmolding the at least one active member is advantageous in that it makes it possible to have various shapes for each active member and to engrave on each active member symbols or alphanumeric characters forming, e.g., words, pictograms or logos. According to one feature, the support of the reinforcing strip may be formed from and/or cut out of a web of polymer material. Advantageously, the reinforcing strip may be produced according to a roll-to-roll process, the web of polymer material extending from a first reel, from which it is unwound before an overmolding operation, to a second reel, on which it is wound after an overmolding operation.

In one embodiment, the support of the reinforcing strip is made of a first polymer-based material while the at least one active member of the reinforcing strip is made of a second polymer-based material, the support and the at least one active member being integrally formed by bi-injection molding. In this embodiment, the reinforcing strip can be manufactured easily and reliably by bi-injection molding, using a single mold having a first cavity for the support and a second cavity for the at least one active member. In the same way as overmolding, bi-injection molding makes it possible to have various shapes for each active member and to engrave on each active member symbols or alphanumeric characters forming, e.g., words, pictograms or logos.

In one embodiment, the at least one active member of the reinforcing strip is a solidified structure made of a polymer-based material deposited in molten form on a surface of the support, e.g. by hot-melt extrusion, so as to be thermally bonded therewith. In this embodiment, the reinforcing strip can be manufactured using a hot melt dispensing apparatus, which is less expensive than an injection molding apparatus.

According to one embodiment, the at least one active member of the reinforcing strip is secured to the support by means of an adhesive. By way of example, the adhesive may be selected from rubber adhesives, polyurethane adhesives, acrylic polymer adhesives, epoxy adhesives, crosslinkable or not under the action of ultraviolet radiation, or any other material allowing assembly by the evaporation of a solvent or by the hardening of a binder with heat, pressure or time.

According to one embodiment, the at least one active member of the reinforcing strip is made of a thermoplastic material formulated with at least one active agent belonging to a group of: humidity absorbers; oxygen scavengers; odor absorbers; and/or emitters of humidity or volatile olfactory organic compounds. Examples of suitable dehydrating agents include, without limitation, silica gels, molecular or similar sieves, natural or synthetic zeolites, dehydrating clays, activated alumina, calcium oxide, barium oxide, or deliquescent salts such as magnesium sulfide, calcium chloride, aluminum chloride, lithium chloride, calcium bromide, zinc chloride or the like. Examples of suitable oxygen collecting agents include, without limitation, metal powders having a reducing capacity, in particular iron, zinc, tin powders, metal oxides still having the ability to oxidize, in particular ferrous oxide, as well as compounds of iron such as carbides, carbonyls, hydroxides, used alone or in the presence of an activator such as hydroxides, carbonates, sulfites, thiosulfates, phosphates, organic acid salts, or hydrogen salts of alkaline metals or alkaline earth metals, activated carbon, activated alumina or activated clays. Other agents for collecting oxygen can also be chosen from specific reactive polymers such as those described for example in the patent documents U.S. Pat. No. 5,736,616 A, WO 99/48963 A2, WO 98/51758 A1 and WO 2018/149778 A1.

In one embodiment, the at least one active member of the reinforcing strip is made of an entrained polymer comprising a monolithic material formed of at least a base polymer and an active agent. In one embodiment, the polymer composition of the at least one active member comprises a thermoplastic base polymer and an inorganic desiccant material as the active agent, preferably selected from the group comprising silica gels, molecular sieves, zeolites, clay, hydrate salts, metal oxides and mixtures thereof. The inorganic desiccant material may be present in an amount of 50 wt % or more over the total weight of the polymer composition. Typically, the inorganic desiccant material absorbs, adsorbs, or releases moisture. In one embodiment, the polymer composition of the at least one active member may further comprise an additive, for example a polyether block amide, as disclosed in WO2019197165A1.

According to one embodiment, the surface of the support of the reinforcing strip is compatible with the molten entrained polymer of the at least one active member so as to thermally bond therewith and solidify upon sufficient cooling of the entrained polymer. In one embodiment, the support of the reinforcing strip is a sheet of a thermoplastic polymer. Examples of suitable materials for the support comprise: polyvinyl chloride (PVC), polyvinylidene dichloride (PVDC), a PVC/PVDC combination, a PVC/PTFE combination, polystyrene (PS), polyethylene terephthalate (PET), polyethylene terephtalate glycol-modified (PETG), ethylene vinyl acetate (EVA), polychlorotrifluoroethylene (PCTFE) (e.g., available from Honeywell under the trademark Aclar®), cyclic olefin copolymers (COC) (e.g., available from Topas Advanced Polymers), polyesters, polyolefins, or cellulosic materials.

Preferably, these materials are extrusion-coated or laminated with a sealing layer, which may be, in particular, a polyethylene (PE), a polypropylene (PP), a polyacrylate, an acryl-modified polyolefin, an ethylene acrylate copolymer, an ethylene-methyl methacrylate copolymer, an ethylene-methyl acrylate copolymer, an ethylene-ethyl acrylate copolymer, an ethylene-butyl acrylate copolymer, an ethylene acetate copolymer, an ethylene-vinyl acetate copolymer, a functionalized ethylene copolymer selected from the group of ionomers, or a mixture thereof. A suitable material is for instance Appeel® 20D828 from DOW, which is a modified ethylene acrylate copolymer. The commercially available Surlyn® products of DOW, for example SURLYN 1652, SURLYN 1650, and SURLYN 1601, are examples of suitable ionomers of ethylene acid copolymer.

The size of the support of the reinforcing strip can easily be adjusted according to the design of the blister pack. In one embodiment, the reinforcing strip comprising the support and the at least one active member secured thereto may be manufactured as a continuous roll, which may be cut during the manufacturing of the blister pack, or pre-cut to a desired length and distributed during the manufacturing of the blister pack.

According to one embodiment, the support of the reinforcing strip comprises a polymer-based material capable of being heat-sealed to the blister film. This is advantageous in that the whole of the blister pack can be sealed in a single heat-sealing step. In one embodiment, the materials of the support and the blister film comprise the same polymer. In particular, the blister film can be made of the same thermoplastic polymer as the support of the reinforcing strip, e.g., selected among: polyvinyl chloride (PVC), polyvinylidene dichloride (PVDC), a PVC/PVDC combination, a PVC/PTFE combination, polystyrene (PS), polyethylene terephthalate (PET), polyethylene terephtalate glycol-modified (PETG), ethylene vinyl acetate (EVA), polychlorotrifluoroethylene (PCTFE) (e.g., available from Honeywell under the trademark Aclar®), cyclic olefin copolymers (COC) (e.g., available from Topas Advanced Polymers), polyesters, polyolefins, or cellulosic materials.

Here again, these materials are preferably extrusion-coated or laminated with a sealing layer, which may be, in particular, a polyethylene (PE), a polypropylene (PP), a polyacrylate, an acryl-modified polyolefin, an ethylene acrylate copolymer, an ethylene-methyl methacrylate copolymer, an ethylene-methyl acrylate copolymer, an ethylene-ethyl acrylate copolymer, an ethylene-butyl acrylate copolymer, an ethylene acetate copolymer, an ethylene-vinyl acetate copolymer, a functionalized ethylene copolymer selected from the group of ionomers, or a mixture thereof. A suitable material is for instance Appeel® 20D828 from DOW, which is a modified ethylene acrylate copolymer. The commercially available Surlyn® products of DOW, for example SURLYN 1652, SURLYN 1650, and SURLYN 1601, are examples of suitable ionomers of ethylene acid copolymer.

According to one feature, a thickness of the support of the reinforcing strip is less than or equal to 0.5 mm, preferably less than or equal to 0.3 mm, more preferably less than or equal to 0.2 mm. With such a reduced thickness of the support, the quality of the sealing of the lidding film with respect to the blister film is preserved, both in regions where the lidding film is sealed directly to the blister film and in regions where the lidding film is sealed indirectly to the blister film via the support of the reinforcing strip.

According to one feature, in the sealed configuration of the blister pack, the sealing surface of the blister film is a substantially planar surface, wherein a maximum distance between two regions of the sealing surface in a direction orthogonal to a mean plane of the sealing surface is less than or equal to 0.5 mm, preferably less than or equal to 0.3 mm, more preferably less than or equal to 0.2 mm. This also contributes to the quality of the sealing of the lidding film with respect to the blister film, both in regions where the lidding film is sealed directly to the blister film and in regions where the lidding film is sealed indirectly to the blister film via the support of the reinforcing strip.

According to another feature, a minimum distance between the sealing surface of the blister film and a bottom wall of each first recess, second recess and connecting channel of the blister film is higher than 0.5 mm, preferably higher than 1 mm. Such a minimum distance ensures that no sealing is established between the support of the reinforcing strip and the bottom walls. It is particularly important to provide this minimum distance between the sealing surface and a bottom wall of each connecting channel, because a connecting channel is generally designed with a reduced cross section compared to the first and second recesses. This ensures that no seal is established between the support and the lower wall of the connecting channel likely to close the channel.

According to one embodiment, in the sealed configuration of the blister pack, each second recess is connected to a single first recess by a connecting channel. Thanks to this arrangement, the retrieval of a consumable product out of a first recess does not impact the surrounding atmosphere of any other consumable product packaged in the blister pack, since the other first recesses are not connected to the first recess from which a consumable product has been retrieved. On the contrary, when a second recess is connected to several first recesses, as soon as a consumable product is retrieved from one of the first recesses, by opening the lidding film, the active member received in the second recess and the consumable products received in the other first recesses connected thereto are all exposed to the outside atmosphere.

According to one embodiment, in the sealed configuration of the blister pack, each second recess is separated from any other second recess by a sealed structure formed by the support sealed between the lidding film and the blister film and/or formed by the lidding film directly sealed to the blister film. In this way, when a consumable product is retrieved from a first recess by opening the lidding film, e.g. in a "push-through" or "peel-push" manner, only the active member received in the second recess connected to said first recess is exposed to the outside atmosphere, whereas the active members received in other second recesses of the blister pack remain protected by the lidding film sealed to the blister film, either directly or indirectly via the support of the reinforcing strip.

According to one embodiment, the reinforcing strip comprises the support and at least two active members secured to the support, wherein the two active members are arranged on the support so as to be received in two juxtaposed second recesses of the blister film while the support at least partially covers the two juxtaposed second recesses and is in contact with the sealing surface of the blister film in a contact region between the two juxtaposed second recesses, wherein, in the sealed configuration of the blister pack, the two juxtaposed second recesses are separated from each other by a sealed structure formed by the support sealed between the lidding film and the blister film. Such an arrangement makes it possible to have a single support provided with several active members and configured to cover several juxtaposed second recesses in such a way that each active member is received in a given second recess and there is a sealing between the juxtaposed second recesses, thanks to the support sealed between the lidding film and the blister film, advantageously sealed to one and preferably each of the lidding film and the blister film, between the juxtaposed second recesses of each pair of juxtaposed second recesses.

According to one feature of the invention, for each compartment comprising a first recess and a second recess connected to each other by a connecting channel, the lidding film is sealed to the blister film all around the periphery of the compartment, either directly or indirectly via the support of the reinforcing strip. In this way, the blister pack can be sealed easily by heating the whole surface of the lidding film positioned on the blister film and the reinforcing strip, which generates not only the direct sealing between the lidding film and the blister film, but also the indirect sealing via the support of the reinforcing strip.

Another subject of the invention is a method for manufacturing a blister pack, comprising steps of:

a) providing a blister film having at least one first recess for a consumable product and at least one second recess for an active member, wherein each second recess is connected to a first recess by a connecting channel, the blister film having a sealing surface which extends about the periphery of the first and second recesses and each connecting channel;

b) introducing a consumable product in the at least one first recess of the blister film;

c) introducing an active member in the at least one second recess of the blister film;

d) positioning a reinforcing strip on the blister film, in such a way that a support of the reinforcing strip at least partially covers the at least one second recess of the blister film while being in contact with the sealing surface of the blister film in at least one contact region at the periphery of the at least one second recess;

e) positioning a lidding film on the blister film and the reinforcing strip, in such a way that the lidding film covers the at least one first and second recesses, the at least one connecting channel and the sealing surface of the blister film;

f) sealing the lidding film directly to the sealing surface of the blister film, out of the at least one contact region, and sealing the support of the reinforcing strip between the lidding film and the blister film, in the at least one contact region, so that each compartment comprising a first recess and a second recess connected to each other by a connecting channel is closed by the lidding film while keeping the connecting channel open.

Thanks to the method of the invention, the support of the reinforcing strip covers each second recess and is sealed at the periphery of the second recess between the lidding film and the blister film, being advantageously sealed to one and preferably each of the lidding film and the blister film. In one embodiment, in step f), the support of the reinforcing strip is sealed, in particular heat-sealed, between and to each of the lidding film and the blister film in the at least one contact region.

According to one embodiment of the method, the reinforcing strip comprises at least one active member secured to the support, and step c) of introducing an active member in the at least one second recess of the blister film is carried out at the same time as step d), by positioning the reinforcing strip on the blister film in such a way that the at least one active member is received in a second recess and the support at least partially covers the second recess while being in contact with the sealing surface of the blister film in at least one contact region at the periphery of the second recess.

According to one embodiment of the method, the blister film comprises at least two second recesses whereas the reinforcing strip comprises at least two active members secured to the support, and:

step c) is carried out at the same time as step d), by positioning the reinforcing strip on the blister film in such a way that the two active members are received in two juxtaposed second recesses of the blister film and the support at least partially covers the two juxtaposed second recesses while being in contact with the sealing surface of the blister film at least in a contact region between the two juxtaposed second recesses, and in step f), the support of the reinforcing strip is sealed between the lidding film and the blister film in the contact region between the two juxtaposed second recesses, so that, in the sealed configuration of the blister pack, the two juxtaposed second recesses are separated from each other by a sealed structure formed by the support sealed between the lidding film and the blister film.

Another subject of the invention is a reinforcing strip for a blister pack, comprising a support and at least one active member secured to the support, wherein:

the support is a sheet of a polymer-based material, preferably having a thickness of less than or equal to 0.5 mm, preferably less than or equal to 0.3 mm, more preferably less than or equal to 0.2 mm, capable of being heat-sealed to both a blister film and a lidding film of the blister pack, and the at least one active member is a solidified polymer-based structure bonded to the support, preferably while in molten form.

According to one embodiment of the reinforcing strip, the at least one active member is a solidified structure made of a polymer-based material overmolded over the support, by injection of a thermoplastic material in a mold cavity in which the support has been placed. According to one feature, the reinforcing strip may be produced according to a roll-to-roll process, the support being formed from and/or cut out of a web of polymer material extending from a first reel, from which it is unwound before an overmolding operation, to a second reel, on which it is wound after an overmolding operation.

According to one embodiment of the reinforcing strip, the support is made of a first polymer-based material while the at least one active member is made of a second polymer-based material, the support and the at least one active member being integrally formed by bi-injection molding.

According to one embodiment of the reinforcing strip, the at least one active member is a solidified structure made of a polymer-based material deposited in molten form on a surface of the support, e.g. by hot-melt extrusion, so as to be thermally bonded therewith.

According to one embodiment of the reinforcing strip, the at least one active member is secured to the support by means of an adhesive. By way of example, the adhesive may be selected from rubber adhesives, polyurethane adhesives, acrylic polymer adhesives, epoxy adhesives, crosslinkable or not under the action of ultraviolet radiation, or any other material allowing assembly by the evaporation of a solvent or by the hardening of a binder with heat, pressure or time.

BRIEF DESCRIPTION OF THE DRAWINGS

Features and advantages of the invention will become apparent from the following description of several embodiments of a blister pack and a manufacturing method according to the invention, this description being given merely by way of example and with reference to the appended drawings in which.

ILLUSTRATIVE EMBODIMENTS OF THE INVENTION

Figures 1, 2, 3:
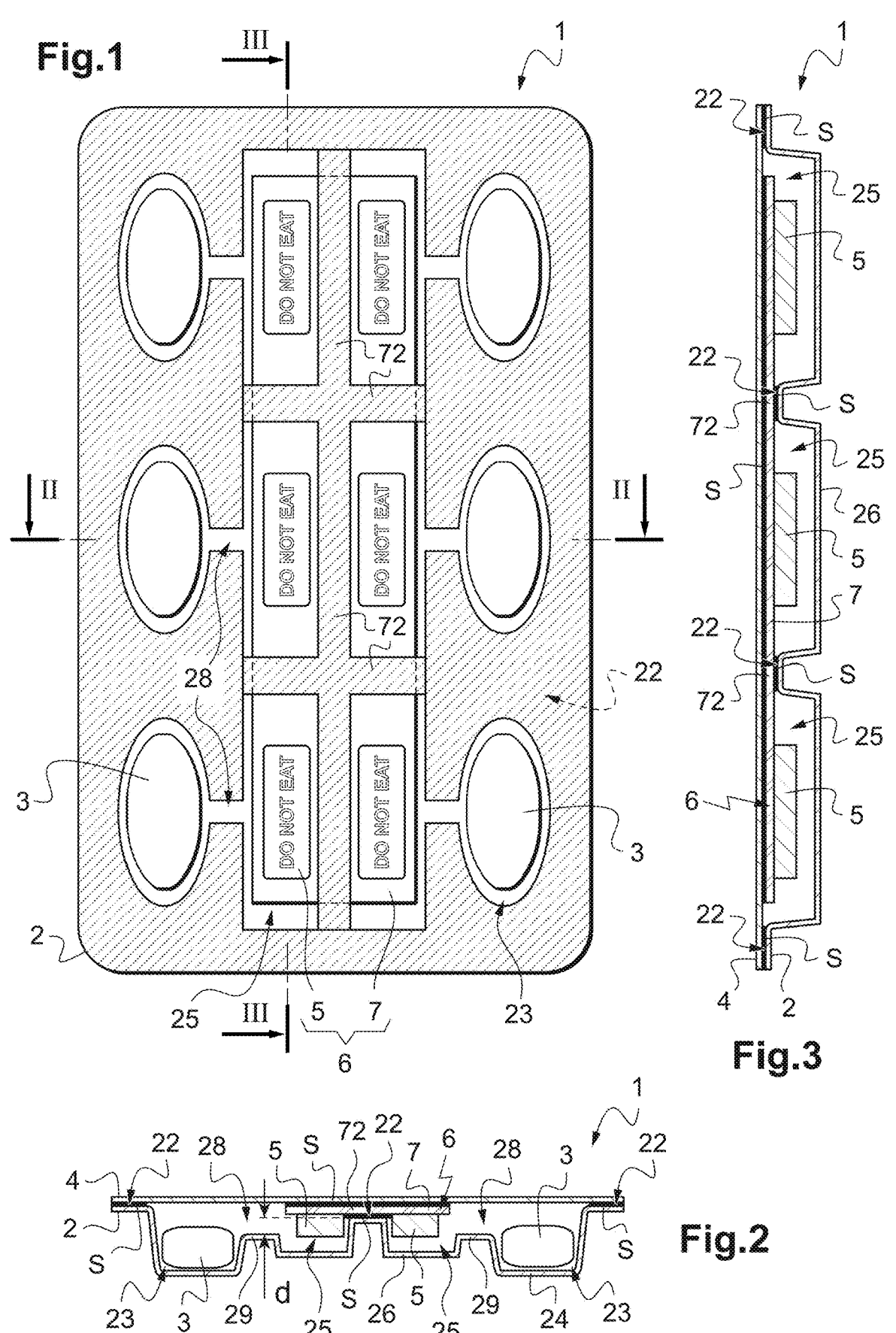
FIG. 1 is a top view of a blister pack according to a first embodiment of the invention, from the side of the blister film, schematically showing sealing regions where the lidding film is sealed to the blister film, either directly or indirectly via a support of a reinforcing strip.
FIG. 2 is a cross section along the line II-II of FIG. 1.
FIG. 3 is a cross section along the line III-III of FIG. 1.

In the first embodiment shown in FIG. 1 to 4, the blister pack 1 comprises a thermoformed blister film 2 having six first recesses 23 for consumable products 3 and six second recesses 25 for active members 5. Each second recess 25 is connected to a single first recess 23 by a connecting channel 28, and vice versa. The blister pack 1 also comprises a lidding film 4 heat-sealed to a sealing surface 22 of the blister film about the periphery of the first and second recesses 23, 25 and each connecting channel 28, so as to close each compartment comprising a first recess 23 and a second recess 25 connected to each other by a connecting channel 28, while keeping the connecting channel 28 open.

In accordance with the invention, the blister pack 1 further comprises a reinforcing strip 6 having a support 7 and six active members 5 secured to the support 7. The support 7 is configured to at least partially cover all of the six second recesses 25 while each active member 5 is received in a respective second recess 25. In this configuration, the support 7 is in contact with the sealing surface 22 of the blister film 2 in contact regions 72 at the periphery of each second recess 25. In the sealed configuration of the blister pack 1, the support 7 is sealed between and to each of the lidding film 4 and the blister film 2 in each contact region 72.

In order to be able to seal the entire blister pack 1 in a single heat-sealing step, the support 7 of the reinforcing strip 6 comprises a polymer-based material capable of being heat-sealed to the blister film 2. Advantageously, in this first embodiment, the support 7 of the reinforcing strip 6 is made of the same thermoplastic polymer as the blister film 2, e.g., a polyvinyl chloride (PVC). In addition, the support 7 of the reinforcing strip 6 is selected to have a thickness of less than or equal to 0.5 mm, preferably less than or equal to 0.3 mm, more preferably between 5 μm and 300 μm, so that the quality of the sealing of the lidding film 4 with respect to the blister film 2 is preserved both in the contact regions 72, where the lidding film 4 is sealed indirectly to the blister film 2 via the support 7, and in the other regions, where the lidding film 4 is sealed directly to the blister film 2.

Incidentally, in the sealed configuration of the blister pack 1, the sealing surface 22 of the blister film 2 is a substantially planar surface, wherein a maximum distance between two regions of the sealing surface, in a direction orthogonal to a mean plane of the sealing surface 22, is less than or equal to 0.5 mm, preferably less than or equal to 0.3 mm, more preferably less than or equal to 0.2 mm. To ensure that the connecting channels 28 are kept open upon heat-sealing, a minimum distance d between the sealing surface 22 of the blister film 2 and a bottom wall 24, 26, 29 of each first recess 23, second recess 25 and connecting channel 28 is selected to be higher than 0.5 mm, preferably higher than 1 mm. Such a minimum distance d, for example visible in FIG. 2, ensures that no sealing is established between the support 7 of the reinforcing strip and the bottom walls 24, 26, 29.

According to one non-limiting example of a blister pack according to the first embodiment:

The blister film 2 is a film of polyvinyl chloride (PVC), having a thickness of the order of 250 μm, for example BLISFORM MV from BILCARE which has been heated and thermoformed so as to form the six first recesses 23 and the six second recesses 25, with each second recess 25 being connected to a first recess 23 by a connecting channel 28.

The lidding film 4 is a multi-layer film comprising a layer of print primer, an aluminum foil layer, a tie resin layer, and a sealant resin, optionally containing an embrittling agent, for example ZEON+PR 25 μm from BILCARE.

The support 7 of the reinforcing strip 6 is a film of polyvinyl chloride (PVC), having a thickness of the order of 250 μm, for example BLISFORM MV from BILCARE.

Figure 17:
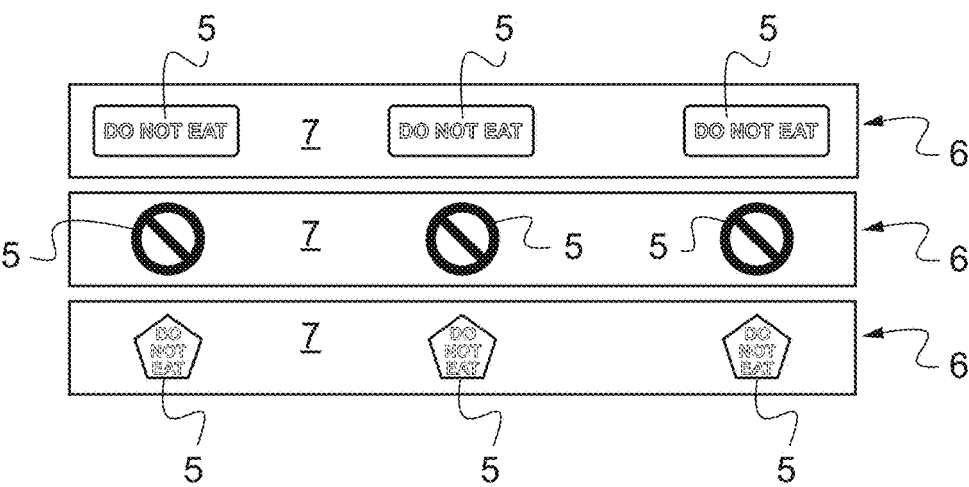
FIG. 17 is a top view of three variants of a reinforcing strip which may be used in a blister pack according to the invention, e.g. manufactured by overmolding the active members on the support of the reinforcing strip.

Each active member 5 of the reinforcing strip 6 is made of a thermoplastic material formulated with an inorganic desiccant material, for example Advanced Desiccant Polymer (ADP) from AIRNOV. As shown for illustration in FIGS. 1 to 3, each active member 5 is a parallelepiped, e.g. having a thickness of between 0.1 mm and 20 mm and side dimensions of between 3 mm and 50 mm. Of course, as a variant, the active members 5 may have other shapes, for example each active member 5 may be a disc, or any type of polygon or symbol, as shown for illustrative purposes in FIG. 17. Whatever the shape of the active member 5, it advantageously has a thickness of between 0.1 mm and 20 mm and is inscribed in a circle having a diameter of between 3 mm and 50 mm.

Figure 16:
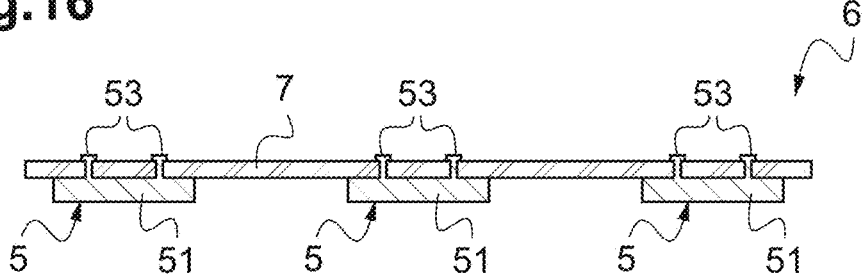
FIG. 16 is a schematic cross section of a variant of a reinforcing strip which may be used in a blister pack according to the invention.
Figure 18:
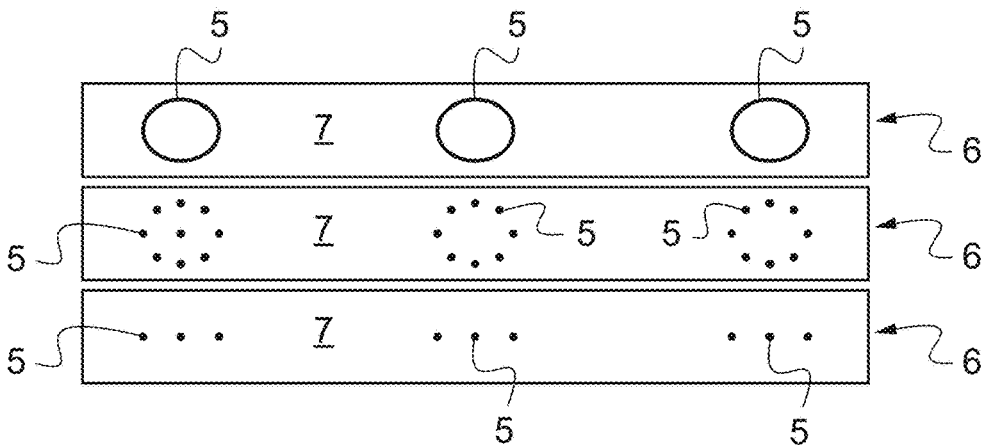
FIG. 18 is a top view of three other variants of a reinforcing strip which may be used in a blister pack according to the invention, e.g. manufactured by hot-melt deposition of the active members on the support of the reinforcing strip.
Figures 19, 20, 21:
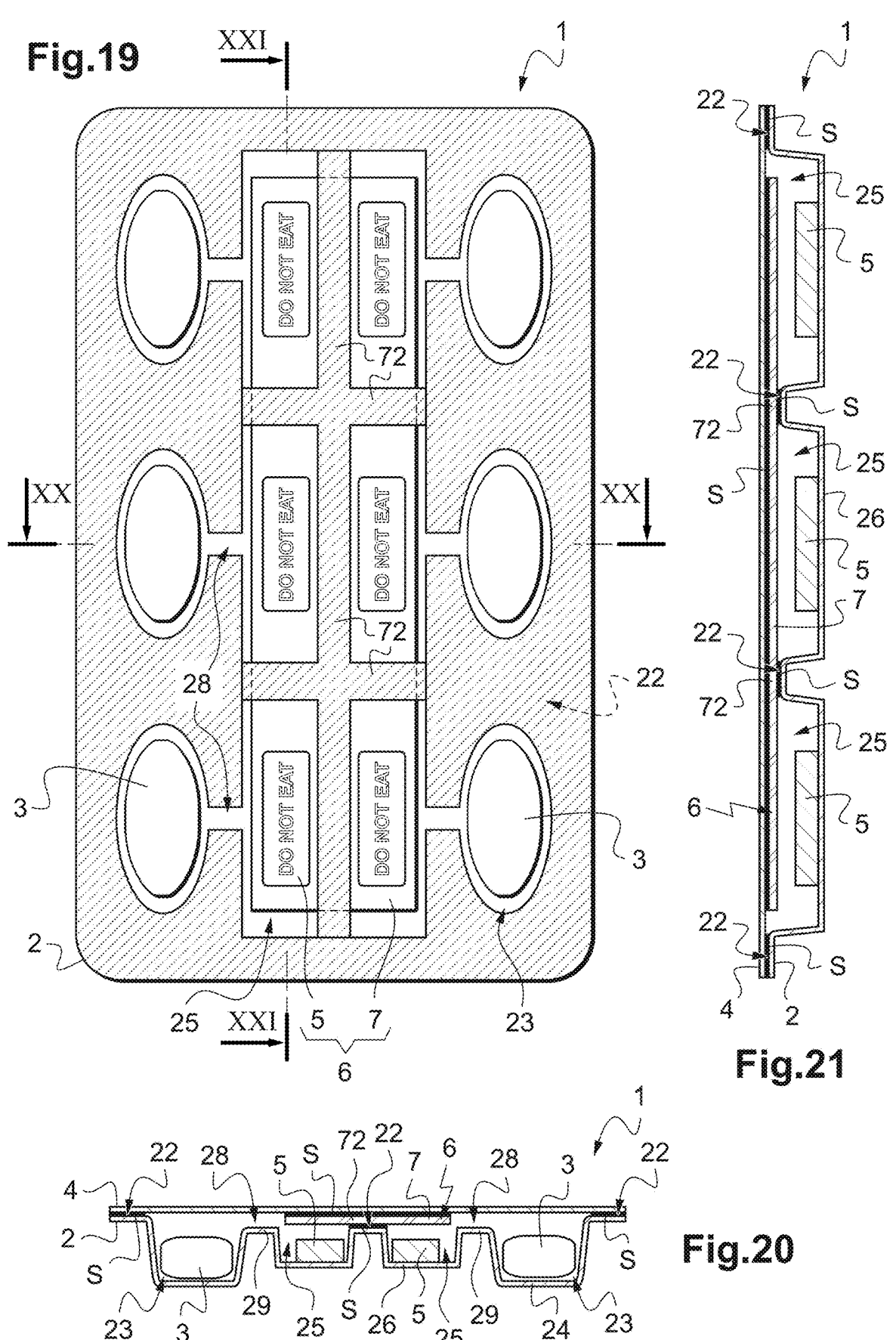
FIG. 19 is a top view of a blister pack according to a further embodiment of the invention.
FIG. 20 is a cross section along the line XX-XX of FIG. 19.
FIG. 21 is a cross section along the line XXI-XXI of FIG. 19.

The reinforcing strip 6 is advantageously prepared by overmolding the six active members 5 over the support 7, by injection of the thermoplastic material of the active members 5 in a mold cavity where each zone of the support 7 which is intended to receive an active member 5 has been placed. With the overmolding process, each active member 5 is bonded to the support 7 while in molten form. In the example shown in FIG. 1, the mold cavity is adapted so that the words "DO NOT EAT" are engraved on each active member 5, on the opposite side from the support 5. The overmolding process can also make it possible to reinforce the attachment of the active members 5 to the support 7, e.g. by overmolding the active members into a shape incorporating fasteners, such as the fasteners 53 shown in FIG. 16. The active members 5 can also be obtained and secured to the support 7 by other processes than overmolding, e.g. by bi-injection, hot-melt extrusion, etc. FIG. 18 gives examples of other shapes of active members 5, composed of lines or dots, which can be obtained by hot-melt extrusion.

Figure 4:
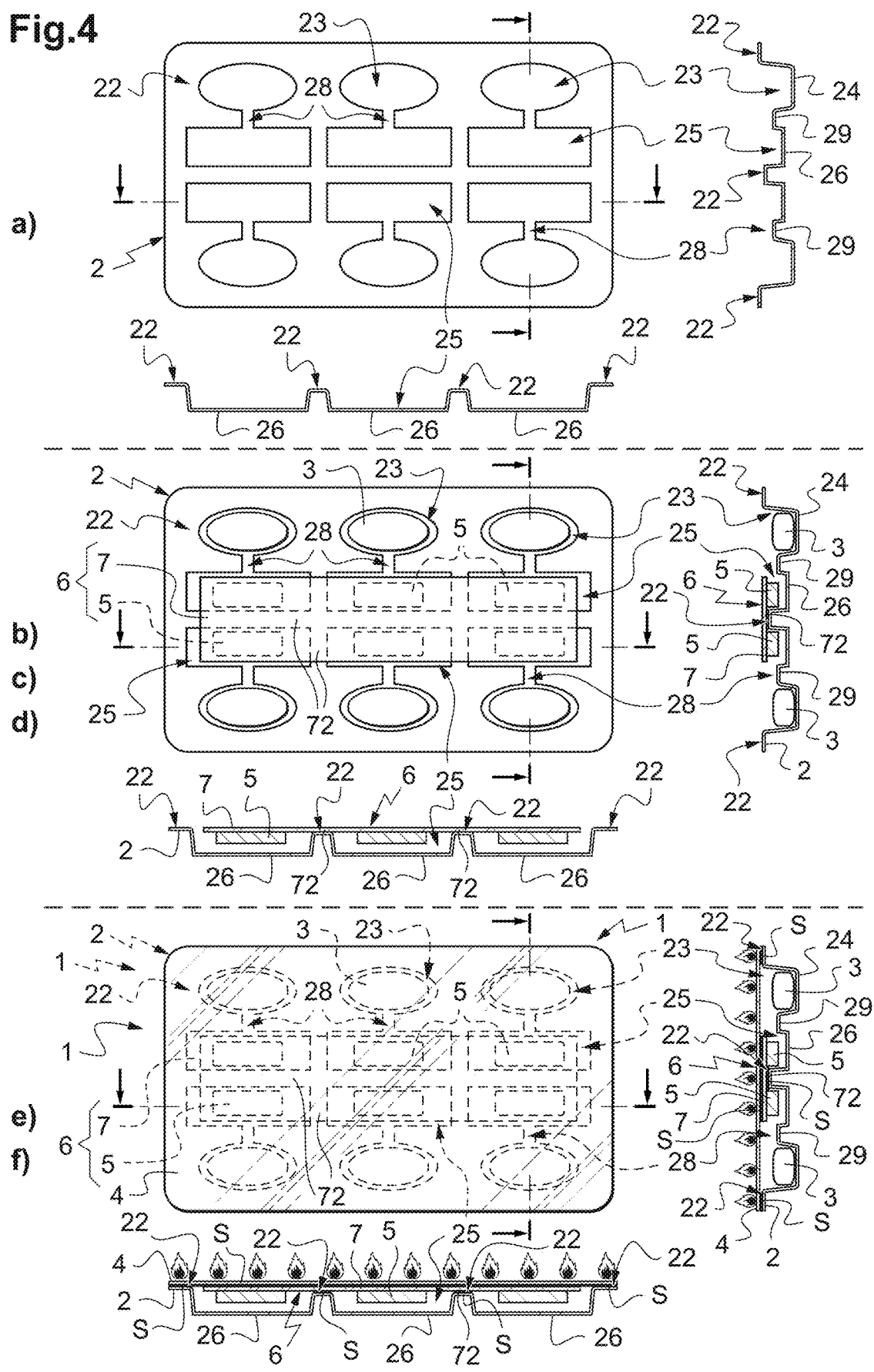
FIG. 4 is a schematic view showing successive steps a) to f) of a method for manufacturing the blister pack of FIG. 1, where the elements of the blister pack are shown, at the successive steps, according to a top view from the side of the lidding film and according to two cross sections.

A method for manufacturing the blister pack 1 of the first embodiment comprises steps as described below, with reference to FIG. 4.

First, the blister film 2 is provided (step a)), where the blister film 2 has for example been heated and thermoformed so as to form the six first recesses 23 and the six second recesses 25, with each second recess 25 being connected to a first recess 23 by a connecting channel 28. A consumable product 3 is then introduced in each first recess 23 of the blister film 2 (step b)). The consumable products 3 may be sensitive products, e.g., pharmaceutical, nutraceutical or herbal products, for example in the form of pills, lozenges, tablets, etc. Then, the insertion of an active member 5 in each second recess 25 of the blister film 2 (step c)) is advantageously performed at the same time as positioning the support 7 of the reinforcing strip 6 on the blister film to cover the second recesses 25 (step d)), thanks to the configuration of the reinforcing strip 6 such that, when each active member 5 is received in a respective second recess 25, the support 7 partially covers all of the six second recesses 25. At this stage, the support 7 of the reinforcing strip 6 rests in contact on the sealing surface 22 of the blister film, in contact regions 72 along at least two sides at the periphery of each second recess 25.

In the following step, the lidding film 4 is positioned on the superimposed blister film 2 and reinforcing strip 6 (step e)), so as to cover the whole surface thereof, i.e. so as to cover the surface area of all of the first recesses 23, the second recesses 25, the connecting channels 28 and the sealing surface 22 of the blister film 2. Then, the whole surface of the lidding film 4 positioned on the blister film 2 and the reinforcing strip 6 is heated, as illustrated by the flames in the bottom part of FIG. 4 (step f)). Under the effect of heating and pressure applied on the lidding film 4, the support 7 of the reinforcing strip 6 is heat-sealed to both the lidding film 4 and the blister film 2 in the contact regions 72, and the lidding film 4 is heat-sealed directly to the sealing surface 22 of the blister film 2 out of the contact regions 72, so that each compartment comprising a first recess 23 and a second recess 25 connected to each other by a connecting channel 28 is closed by the lidding film 4 while keeping the connecting channel 28 open.

Thanks to the method of the invention, the blister pack 1 can be sealed easily, by heating the whole surface of the lidding film 4 positioned on the blister film 2 and the reinforcing strip 6, which generates not only the direct heat-sealing between the lidding film 4 and the blister film 2 out of the contact regions 72, but also the heat-sealing via the support 7 of the reinforcing strip 6 in the contact regions 72. Thanks to the specific design of the different elements of the blister pack 1, in particular the selection of a thickness of the support 7 of less than 0.5 mm and a distance d higher than 1 mm, the heat-sealing via the support 7 is obtained automatically in the contact regions 72 without however closing the channels 28 where the distance d prevents heat-sealing even if in cases where the support 7 extends in the channel 28. Advantageously, it is therefore not necessary to have a localized heating with a specific pattern corresponding to the contact regions 72, which would make the heat-sealing step more complex and expensive.

As it emerges from the above, in the sealed configuration of the blister pack 1, the support 7 of the reinforcing strip 6 covers each second recess 25 and is heat-sealed along at least two sides at the periphery of each second recess 25, to both the blister film 2 and the lidding film 4. Due to the presence of this support 7 which is firmly attached to both the blister film 2 and the lidding film 4, a user cannot retrieve any active member 5 from a second recess 25 in a "push-through" manner (or "peel-push" manner, if the lidding film 4 comprises an upper layer to be peeled away). Thus, the risk of accidental ingestion of an active member 5 is significantly reduced with the blister pack 1 of the invention. The dimensions of the support 7 of the reinforcing strip 6, which extends over the six second recesses 25, also contribute to limiting the risk of accidental ingestion of the active members secured thereto.

In addition, thanks to the specific design of the elements of the blister pack 1, in the sealed configuration of the blister pack and for each pair of juxtaposed second recesses 25, there is a heat-sealed region 72 of the support 7 between the two recesses 25. Thus, in the sealed configuration, each second recess 25 is fluidly separated from any other second recess 25, and each second recess 25 is connected to a single first recess 23 by a connecting channel 28. Thanks to this arrangement, when a consumable product 3 is retrieved from a first recess 23 by opening the lidding film 4, only the active member 5 received in the second recess 25 connected to said first recess 23 is exposed to the outside atmosphere, whereas the active members 5 received in other second recesses 25 of the blister pack 1 remain protected by the lidding film 4 sealed to the blister film 2, either directly or indirectly via the support 7 of the reinforcing strip 6. The retrieval of a consumable product 3 out of a first recess 23 also does not impact the surrounding atmosphere of any other consumable product 3 packaged in the blister pack 1, since the other first recesses 23 are not connected to the first recess 23 from which a consumable product 3 has been retrieved.

Figures 5, 6:
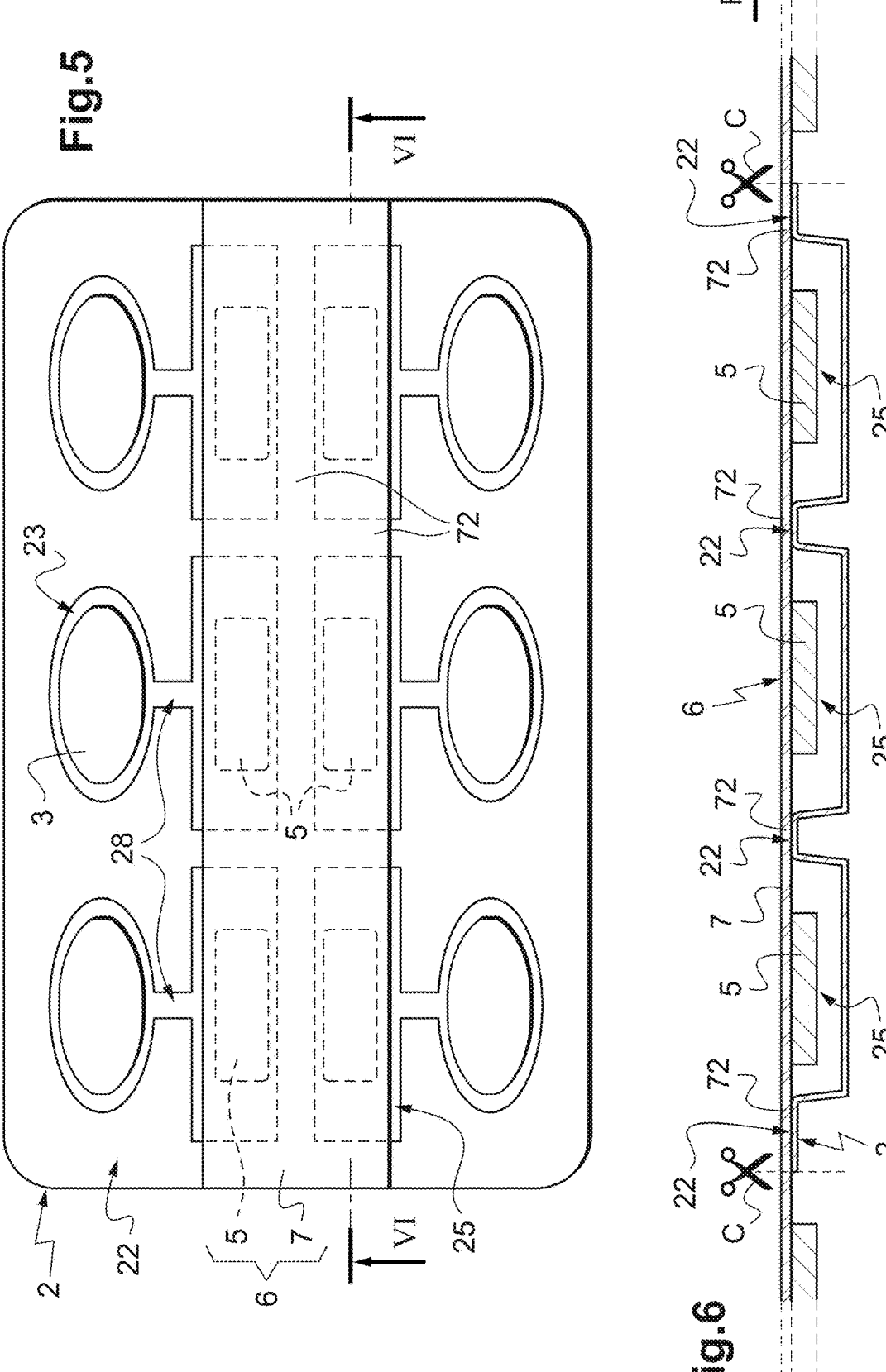
FIG. 5 is a top view, similar to that of step d) of FIG. 4, of the manufacturing method of a blister pack according to a second embodiment of the invention.
FIG. 6 is a cross section along the line VI-VI of FIG. 5, showing a configuration where the reinforcing strip is positioned on the blister film and cut from a continuous roll during the manufacturing of the blister pack.

In the second embodiment shown in FIGS. 5 and 6, elements that are similar to those of the first embodiment have the same references. The blister pack 1 of the second embodiment differs from the first embodiment in that the support 7 of the reinforcing strip 6 is cut from a continuous roll directly during the manufacturing of the blister pack 1. More precisely, the support 7 is cut out of a web of polymer material, as shown by the arrows C of FIG. 6. Advantageously, the reinforcing strip 6 may be produced and integrated into the blister pack according to a roll-to-roll process, the web of polymer material of the support 7 extending from a first reel (not shown in the figures, which would be on the left of FIG. 6), from which it is unwound in the direction of arrow F, to a second reel (also not shown in the figures, which would be on the right of FIG. 6), on which it is re-wound.

Figures 7, 8, 9:
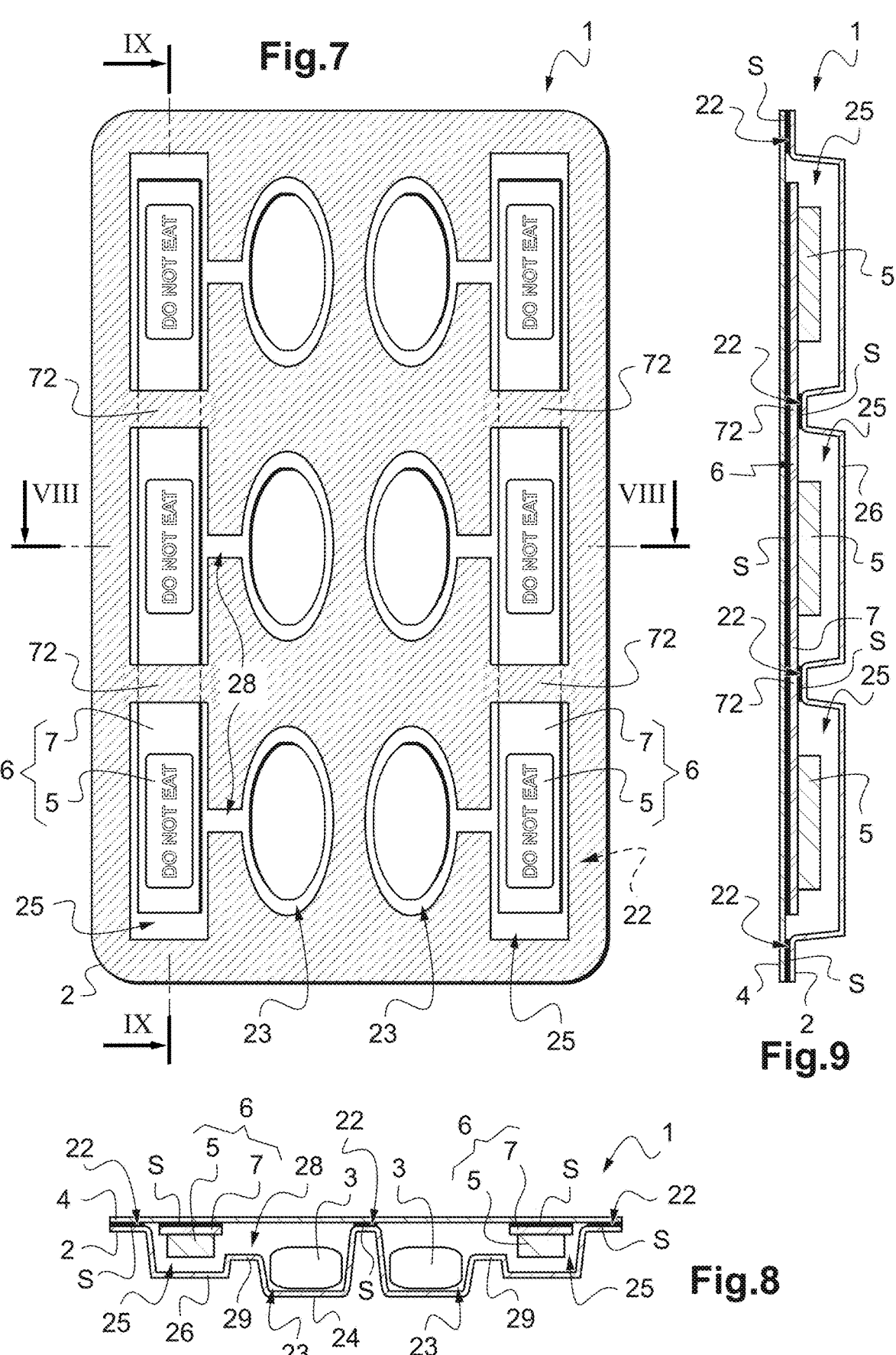
FIG. 7 is a top view similar to FIG. 1 of a blister pack according to a third embodiment of the invention.
FIG. 8 is a cross section along the line VIII-VIII of FIG. 7.
FIG. 9 is a cross section along the line IX-IX of FIG. 7.

In the third embodiment shown in FIGS. 7 to 9, elements that are similar to those of the first embodiment have the same references. The blister pack 1 of the third embodiment differs from the first embodiment in that it comprises two distinct reinforcing strips 6 positioned externally relative to the first recesses 23 for the consumable products 3. In this third embodiment, in the sealed configuration of the blister pack 1, the support 7 of each reinforcing strip 6 covers three second recesses 25 and is heat-sealed on at least one side at the periphery of each second recess 25, in at least one contact region 72, to both the blister film 2 and the lidding film 4.

Figures 10, 11, 12:
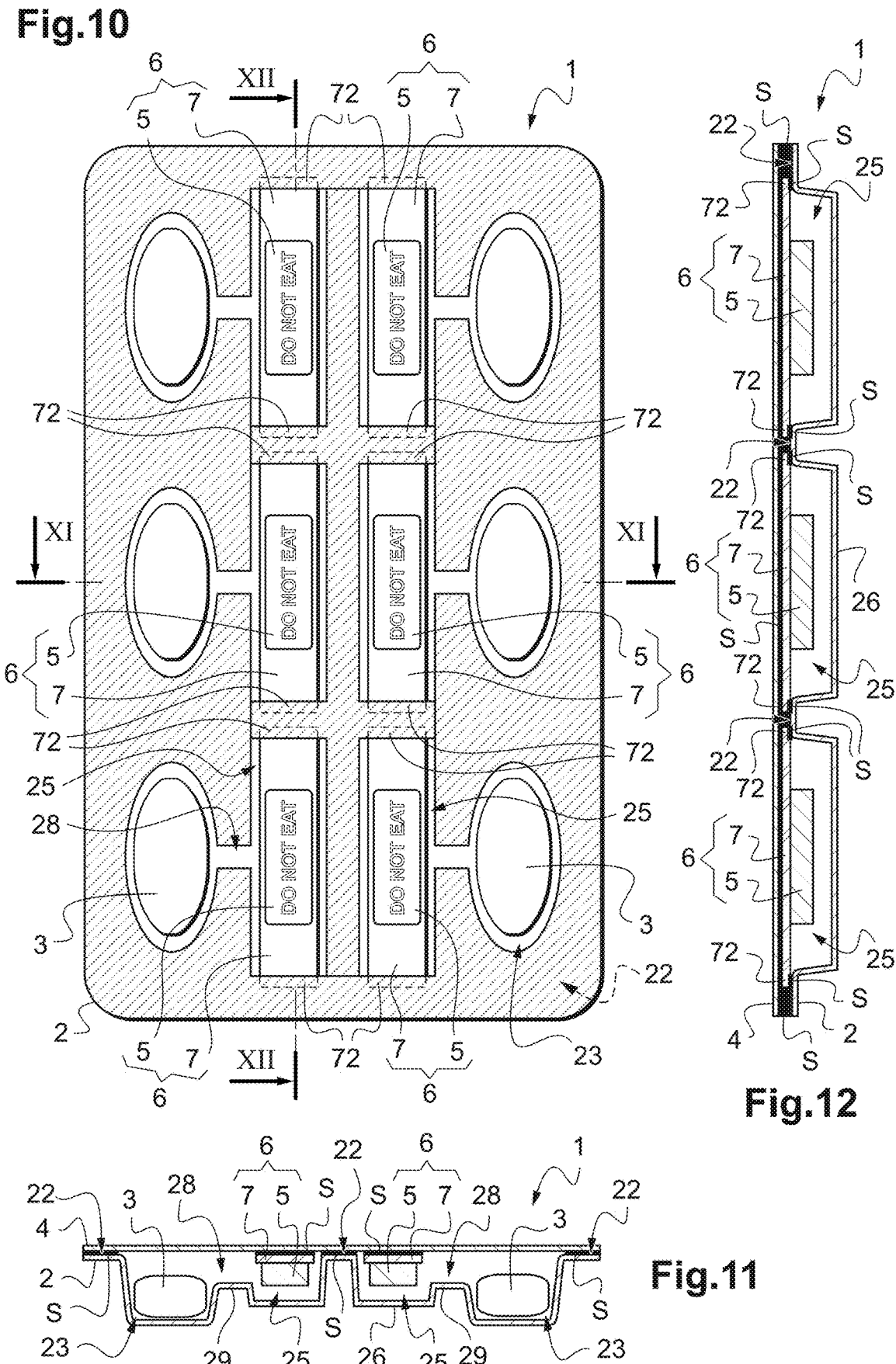
FIG. 10 is a top view similar to FIG. 1 of a blister pack according to a fourth embodiment of the invention.
FIG. 11 is a cross section along the line XI-XI of FIG. 10.
FIG. 12 is a cross section along the line XII-XII of FIG. 10.

In the fourth embodiment shown in FIGS. 10 to 12, elements that are similar to those of the first embodiment have the same references. The blister pack 1 of the fourth embodiment differs from the first embodiment in that it comprises six distinct reinforcing strips 6, each positioned facing a respective second recess 25 for an active member 5, which is connected to a single first recess 23 for a consumable product 3. In this fourth embodiment, in the sealed configuration of the blister pack 1, the support 7 of each reinforcing strip 6 covers one second recess 25 and is heat-sealed on at least two sides at the periphery of each second recess 25, in contact regions 72, to both the blister film 2 and the lidding film 4.

Figures 13, 14, 15:
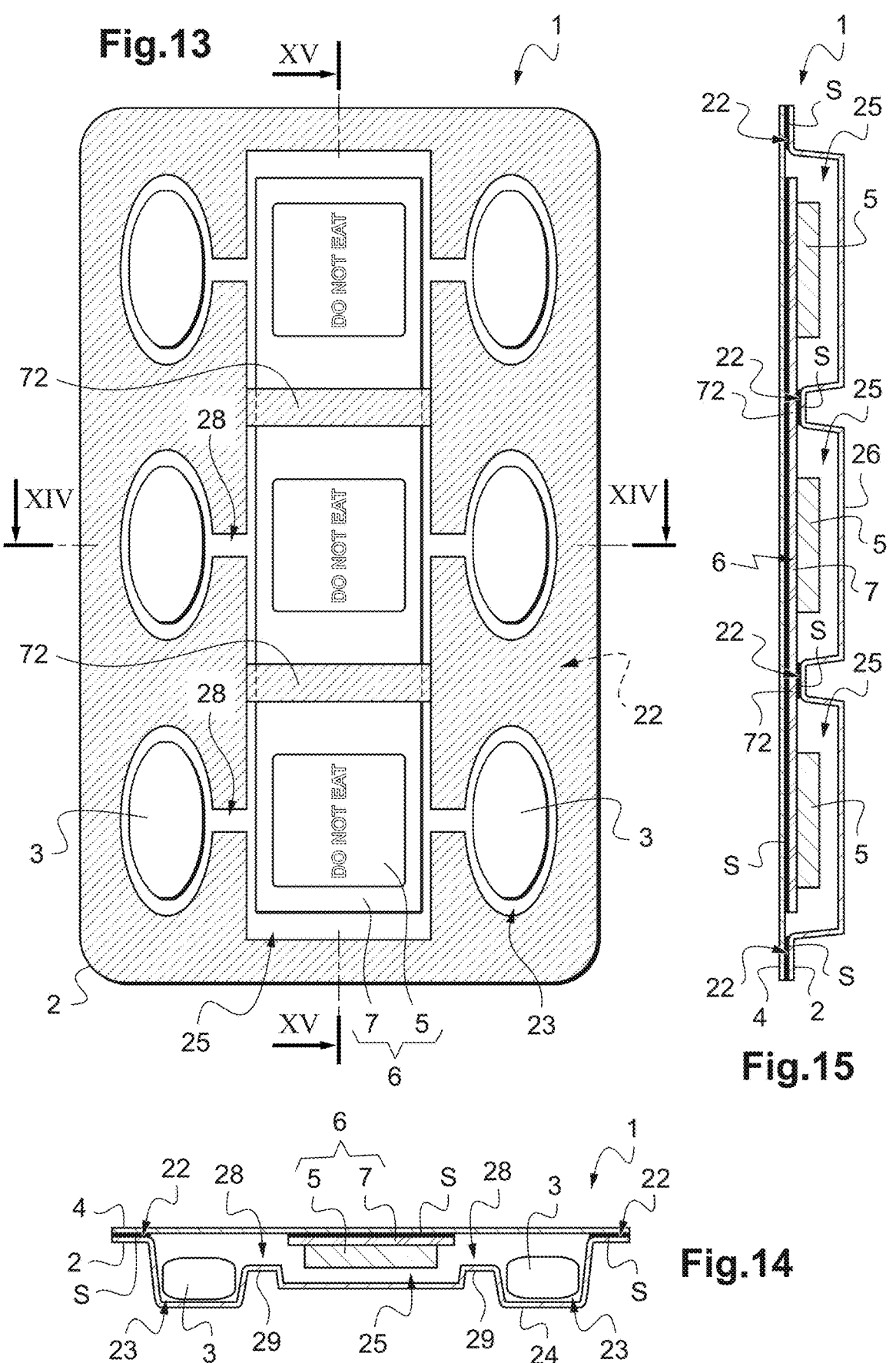
FIG. 13 is a top view similar to FIG. 1 of a blister pack according to a fifth embodiment of the invention.
FIG. 14 is a cross section along the line XIV-XIV of FIG. 13.
FIG. 15 is a cross section along the line XV-XV of FIG. 13.

In the fifth embodiment shown in FIGS. 13 to 15, elements that are similar to those of the first embodiment have the same references. The blister pack 1 of the fifth embodiment differs from the first embodiment in that it comprises one reinforcing strip 6, positioned facing three second recesses 25 for active members 5 which are each connected to two first recesses 23 for consumable products 3. In this fifth embodiment, in the sealed configuration of the blister pack 1, the support 7 of the reinforcing strip 6 covers the three second recesses 25 and is heat-sealed on at least one side at the periphery of each second recess 25, in contact regions 72, to both the blister film 2 and the lidding film 4.

As can be seen from the various embodiments described above, a blister pack according to the invention provides a mechanically resistant solution to prevent accidental ingestion of an active member included within a blister pack: the active member is advantageously secured to a support of a reinforcing strip, which is itself sealed to the blister film and to the lidding film of the blister pack; the support of the reinforcing strip is preferably designed with large dimensions to avoid accidental ingestion; the user can furthermore be informed by an additional printing provided on the lidding film, clearly indicating the positions of the consumable products; the appearance of the active member, including its shape, color, an engraved message, etc., can also be modified to further prevent accidental ingestion. Another advantage of a blister pack according to the invention is that it provides a large design flexibility. In particular, each active member can be large and/or thick as needed, especially larger than the packaged consumable products. Advantageously, the reinforcing strip can be integrated into the blister pack using conventional blister assembly lines.

The invention is not limited to the examples described and shown. In particular, even if it is advantageous to have each active member of the blister pack secured to a support of a reinforcing strip, it is however not excluded that the active members may be independent of a support and introduced in the second recesses (step c)) independently of the positioning of the support on the blister film (step d)). In addition, as mentioned above, the active members may be of any type useful for the preservation and/or consumption of the consumable products packaged in the blister pack, e.g. a humidity absorber (or desiccant), an oxygen scavenger, a carbon dioxide scavenger, an odor absorber, a humidity emitter, a fragrance emitter, an aroma emitter, a nutrient emitter, a humidity-controlling substance. The invention may also be applied to different types of blister packs, including for example: push-though blister packs as well as peel-push blister packs; blister packs with a polymer blister film as well as blister packs with a cold forming blister laminate; etc. Of course, many other variants can be considered, falling within the scope of the appended claims.

The invention claimed is:

1. A blister pack comprising:
   a blister film having at least one first recess for a consumable product and at least one second recess for an active member, wherein each second recess is connected to a first recess by a connecting channel, the whole of at least one of the first recesses and at least one of the second recesses connected to each other by a connecting channel thereby defining a compartment, wherein the blister film has a sealing surface which extends about a periphery of the first and second recesses and each connecting channel,
   a lidding film sealed to the sealing surface of the blister film so as to close each compartment while keeping the connecting channel open to airflow,
   wherein the blister pack further comprises a reinforcing strip having a support which at least partially covers at least one of the second recesses of the blister film, while being in contact with the sealing surface of the blister film in at least one contact region at the periphery of the at least one second recess,
   wherein, among the first and second recesses, only the at least second recess is covered by the support of the reinforcing strip,
   wherein, in a sealed configuration of the blister pack, the support of the reinforcing strip is sealed between the lidding film and the blister film while being in contact with both the lidding film and the blister film in the at least one contact region.

2. The blister pack according to claim 1, wherein at least one active member is secured to the support of the reinforcing strip.

3. The blister pack according to claim 2, wherein the at least one active member comprises a solidified polymer-based structure bonded to the support of the reinforcing strip while in molten form.

4. The blister pack according to claim 2, wherein the at least one active member comprises a solidified structure made of a polymer-based material overmolded over the support of the reinforcing strip, by injection of a thermoplastic material in a mold cavity in which the support of the reinforcing strip has been placed.

5. The blister pack according to claim 2, wherein the support of the reinforcing strip comprises a first polymer-based material while the at least one active member comprises a second polymer-based material, wherein the support of the reinforcing strip and the at least one active member are integrally formed by bi-injection molding.

6. The blister pack according to claim 2, wherein the at least one active member comprises a solidified structure made of a polymer-based material deposited in molten form on a surface of the support of the reinforcing strip, so as to be thermally bonded therewith.

7. The blister pack according to claim 1, wherein the support of the reinforcing strip comprises a polymer-based material capable of being heat-sealed to the blister film.

8. The blister pack according to claim 7, wherein the materials of the support of the reinforcing strip and the blister film comprise the same polymer.

9. The blister pack according to claim 1, wherein a thickness of the support of the reinforcing strip is less than or equal to 0.5 mm.

10. The blister pack according to claim 1, wherein a minimum distance (d) between the sealing surface of the blister film and a bottom wall of each first recess, second recess and connecting channel of the blister film is higher than 0.5 mm.

11. The blister pack according to claim 1, wherein, in the sealed configuration of the blister pack, each second recess is connected to a single first recess by one of the connecting channels.

12. The blister pack according to claim 1, wherein, in the sealed configuration of the blister pack, each second recess is separated from any other second recess by a sealed structure formed by the support of the reinforcing strip sealed between the lidding film and the blister film or formed by the lidding film directly sealed to the blister film.

13. The blister pack according to claim 1, wherein at least two active members are secured to the support of the reinforcing strip, wherein the two active members are arranged on the support of the reinforcing strip so as to be received in two juxtaposed second recesses of the blister film while the support of the reinforcing strip at least partially covers the two juxtaposed second recesses and is in contact with the sealing surface of the blister film in a contact region between the two juxtaposed second recesses, wherein, in the sealed configuration of the blister pack, the two juxtaposed second recesses are separated from each other by a sealed structure formed by the support of the reinforcing strip sealed between the lidding film and the blister film.

14. The blister pack according to claim 1, wherein, for each compartment comprising at least one of the first recesses and at least one of the second recesses connected to each other by a connecting channel, the lidding film is sealed to the blister film all around a periphery of the compartment, wherein the sealing all around the periphery of the compartment is a combination of a direct sealing between the lidding film and the blister film, and an indirect sealing via the support of the reinforcing strip.

15. A method for manufacturing a blister pack, comprising steps of:
a) providing a blister film having at least one first recess for a consumable product and at least one second recess for an active member, wherein each second recess is connected to a first recess by a connecting channel, the whole of at least one of the first recesses and at least one of the second recesses connected to each other by a connecting channel thereby defining a compartment, wherein the blister film has a sealing surface which extends about a periphery of the first and second recesses and each connecting channel;
b) introducing a consumable product in the at least one first recess of the blister film;

c) introducing an active member in the at least one second recess of the blister film;
d) positioning a reinforcing strip having a support on the blister film, in such a way that the support of the reinforcing strip at least partially covers at least one of the second recesses of the blister film, while being in contact with the sealing surface of the blister film in at least one contact region at the periphery of the at least one second recess, wherein, among the first and second recesses, only the at least second recess is covered by the support of the reinforcing strip;
e) positioning a lidding film on the blister film and the reinforcing strip, in such a way that the lidding film covers the at least one first and second recesses, the at least one connecting channel and the sealing surface of the blister film;
f) sealing the lidding film directly to the sealing surface of the blister film, out of the at least one contact region, and sealing the support of the reinforcing strip in contact between the lidding film and the blister film, in the at least one contact region, so that each compartment, comprising at least one of the first recesses and at least one of the second recesses connected to each other by a connecting channel, is closed by the lidding film while keeping the connecting channel open to airflow.

16. The method for manufacturing a blister pack according to claim 15, wherein at least one active member is secured to the support of the reinforcing strip, wherein step c) of introducing an active member in the at least one second recess of the blister film is carried out at the same time as step d), by positioning the reinforcing strip on the blister film in such a way that the at least one active member is received in a second recess and the support of the reinforcing strip at least partially covers the second recess while being in contact with the sealing surface of the blister film in at least one contact region at the periphery of the second recess.

17. The method for manufacturing a blister pack according to claim 15, wherein the blister film comprises at least two second recesses and at least two active members are secured to the support of the reinforcing strip, wherein step c) is carried out at the same time as step d), by positioning the reinforcing strip on the blister film in such a way that the two active members are received in two juxtaposed second recesses of the blister film and the support of the reinforcing strip at least partially covers the two juxtaposed second recesses while being in contact with the sealing surface of the blister film at least in a contact region between the two juxtaposed second recesses, and wherein, in step f), the support of the reinforcing strip is sealed in contact between the lidding film and the blister film in the contact region between the two juxtaposed second recesses, so that, in a sealed configuration of the blister pack, the two juxtaposed second recesses are separated from each other by a sealed structure formed by the support of the reinforcing strip sealed in contact between the lidding film and the blister film.

18. A blister pack comprising:
a blister film having at least one first recess for a consumable product and at least one second recess for an active member, wherein each second recess is connected to a first recess by a connecting channel, the whole of at least one of the first recesses and at least one of the second recesses connected to each other by a connecting channel thereby defining a compartment, wherein the blister film has a sealing surface which extends about a periphery of the first and second recesses and each connecting channel, a lidding film sealed to the sealing surface of the blister film so as to close each compartment while keeping the connecting channel open to airflow, wherein the blister pack further comprises a reinforcing strip comprising a support and at least one active member secured to the support such that, when the at least one active member is received in a second recess, the support of the reinforcing strip at least partially covers the second recess and is in contact with the sealing surface of the blister film in at least one contact region at the periphery of the second recess, wherein, in a sealed configuration of the blister pack, the support of the reinforcing strip is sealed between the lidding film and the blister film in at least one contact region.

19. A method for manufacturing the blister pack according to claim 18, comprising steps of:

providing the blister film having the at least one first recess for a consumable product and the at least one second recess for an active member connected to each other by a connecting channel, wherein the sealing surface of the blister film extends about a periphery of the first and second recesses and each connecting channel;

introducing a consumable product in the at least one first recess of the blister film;

providing the reinforcing strip comprising a support and at least one active member secured to the support such that, when the at least one active member is received in a second recess, the support of the reinforcing strip at least partially covers the second recess and is in contact with the sealing surface of the blister film in at least one contact region at the periphery of the second recess;

positioning the reinforcing strip on the blister film, in such a way that the at least one active member is received in a second recess and the support at least partially covers the at least one second recess of the blister film while being in contact with the sealing surface of the blister film in at least one contact region at the periphery of the at least one second recess;

positioning the lidding film on the blister film and the reinforcing strip, in such a way that the lidding film covers the at least one first and second recesses, the at least one connecting channel and the sealing surface of the blister film;

sealing the lidding film directly to the sealing surface of the blister film, out of the at least one contact region, and sealing the support of the reinforcing strip between the lidding film and the blister film, in the at least one contact region, so that each compartment, comprising at least one of the first recesses and at least one of the second recesses connected to each other by a connecting channel, is closed by the lidding film while keeping the connecting channel open to airflow.

20. A reinforcing strip for a blister pack according to claim 18, comprising a support and at least one active member secured to the support, wherein:

the support is a sheet of a polymer-based material, preferably having a thickness of less than or equal to 0.5 mm, preferably less than or equal to 0.3 mm, more preferably less than or equal to 0.2 mm, capable of being heat-sealed to both a blister film and a lidding film of the blister pack, and the at least one active member is a solidified polymer-based structure bonded to the support, preferably while in molten form.

* * * * *